United States Patent [19]

Ohmura et al.

[11] Patent Number: 5,371,574
[45] Date of Patent: Dec. 6, 1994

[54] OPERATION UNIT CONTROL DEVICE FOR IMAGE PROCESSING APPARATUS WITH MULTIPLE FUNCTIONS

[75] Inventors: Hiroshi Ohmura, Tokyo; Masanori Sakai, Yokohama; Kouichi Unno, Tokyo; Hirohiko Ito, Kawasaki, all of Japan

[73] Assignee: Canon Kabushiki Kaisha, Tokyo, Japan

[21] Appl. No.: 80,180

[22] Filed: Jun. 23, 1993

[30] Foreign Application Priority Data

Jun. 24, 1992 [JP] Japan .................................. 4-188980

[51] Int. Cl.⁵ .............................. G03G 21/00
[52] U.S. Cl. .................................... 355/208; 355/202; 355/204; 355/209; 358/468
[58] Field of Search ................. 355/77, 200, 202, 210, 355/204, 208, 209, 244; 358/442, 448, 468; 364/514

[56] References Cited

U.S. PATENT DOCUMENTS

| | | | |
|---|---|---|---|
| 4,901,063 | 2/1990 | Kimura et al. | 340/723 |
| 5,005,137 | 4/1991 | Ernst | 364/514 |
| 5,038,169 | 8/1991 | Marincic et al. | 355/200 |
| 5,049,929 | 9/1991 | Anderson et al. | 355/204 |
| 5,091,747 | 2/1992 | Tsai | 355/202 |
| 5,113,354 | 5/1992 | Harper et al. | 364/514 |
| 5,164,769 | 11/1992 | Hashimoto et al. | 355/202 |
| 5,198,858 | 3/1993 | Sugawa et al. | 355/202 |
| 5,221,973 | 6/1993 | Miller et al. | 358/468 |

Primary Examiner—A. T. Grimley
Assistant Examiner—Sandra L. Brase
Attorney, Agent, or Firm—Fitzpatrick, Cella, Harper & Scinto

[57] ABSTRACT

In an image processing apparatus worth multiple functions, there is provided a method of controlling the function of a peripheral equipment, such as for image filing, facsimile an image printing function, by the control unit of the image processing apparatus. The control program and display data, relating to the image processing function of such peripheral equipment are transferred to, and stored in the composite image processing apparatus, and in response to the selection of such image processing function, the control of the operation unit of the apparatus is switched to a control mode based on the transferred program and display data.

13 Claims, 11 Drawing Sheets

START BIT — D0 D1 D2 D3 D4 D5 D6 D7 P — STOP BIT

| TRANSFER RATE | 9 6 0 0 bps |
|---|---|
| DATA LENGTH | 8 BITS |
| PARITY | ODD |
| STOP BIT | BITS |

COMMAND

| 0 | 0 | 0 | 0 | 0 | 0 | 1 | 1 |

0 3 H : OPERATION UNIT CONTROL PROGRAM TRANSFER COMMAND

| 0 | 0 | 0 | 1 | 0 | 0 | 1 | 1 |

1 3 H : OPERATION UNIT CONTROL PROGRAM TRANSFER CONFIRMATION COMMAND

| 0 | 0 | 0 | 0 | 0 | 1 | 0 | 0 |

0 4 H : OPERATION UNIT IMAGE DATA TRANSFER COMMAND

| 0 | 0 | 0 | 1 | 0 | 1 | 0 | 0 |

1 4 H : OPERATION UNIT IMAGE DATA TRANSFER CONFIRMATION COMMAND

OPERATION UNIT CONTROL DEVICE FOR IMAGE PROCESSING APPARATUS WITH MULTIPLE FUNCTIONS

BACKGROUND OF THE INVENTION

1. Field of the Invention

The present invention relates to the control of an operation unit for an image processing apparatus with multiple functions such as a filing function, a facsimile function or the like.

2. Related Background Art

There have recently been commercialized composite image processing apparatus having multiple functions, formed by providing the image processing apparatus, such as copying apparatus, with additional functions such as a printer function for printing a computer output, a scanner function for reading an original on an original table and entering the information into computers, and a facsimile function for image transmission and reception through public telephone lines etc.

Also some color copying apparatus are so constructed as to easily serve as a printer or a scanner in combination with a computer, by connecting an intelligent processing unit (IPU), for realizing a interface with various analog/digital images as an accessory.

For example in a case of utilizing the scanner function in such composite image processing apparatus, the desired image reading operation is started by instructing the image reading operation to a peripheral equipment from the operation unit of the main apparatus.

Also in case of facsimile transmission in a composite image processing apparatus with facsimile function, the telephone number of the destination, the transmission mode etc. are entered from the operation unit of the main apparatus.

However, in such conventional composite image processing apparatus provided with peripheral equipment, the operation sequences depending on the peripheral equipment providing the functions of scanner, printer, facsimile etc. and the images for operation instruction to be displayed on a display device of the operation unit have to be stored in advance in the composite image processing apparatus. For this reason, variations in the operation sequence or in the images for operation instruction, resulting from variations in the control program of such peripheral equipment require not only the variation of the ROM storing such control program in the peripheral equipment but also the variation of the ROM storing the control program of the operation unit in the main image processing apparatus itself, so that an extremely cumbersome procedure is required.

SUMMARY OF THE INVENTION

An object of the present invention is to provide an operation unit control device capable of resolving the above-mentioned drawbacks.

Another object of the present invention is to provide an operation unit control device capable of minimizing the variations in the control of the operation unit even in case of additions or alterations in the functions of each peripheral equipment to be connected to the main image processing apparatus.

Still another object of the present invention is to provide an operation unit control device capable of easily responding to the variations in the functions of the peripheral equipment, by storing the operation unit control programs and the display data relating to the functions of the peripheral equipment in the peripheral equipment, transferring the programs and display data to the image processing unit and controlling the operation unit by the image processing apparatus based on thus transferred programs and display data.

Still another object of the present invention is to provide an operation unit control device capable of easily responding to the variations in the functions of the peripheral equipment, by storing the operation unit control programs and the display data relating to the functions of the peripheral equipment in the peripheral equipment, transferring the display data to the image processing unit and sending commands from the peripheral equipment based on the control programs to the image processing equipment thereby controlling the operation unit.

Still another object of the present invention is to provide an operation unit control device capable of preventing the capacity increase of a program memory relating to the operation unit control in the image processing apparatus, regardless of the kinds of functions of the peripheral equipment.

Still other objects of the present invention, and the features thereof, will become fully apparent from the following description, which is to be taken in conjunction with the attached drawings.

DETAILED DESCRIPTION OF THE PREFERRED EMBODIMENTS

Figure 1:
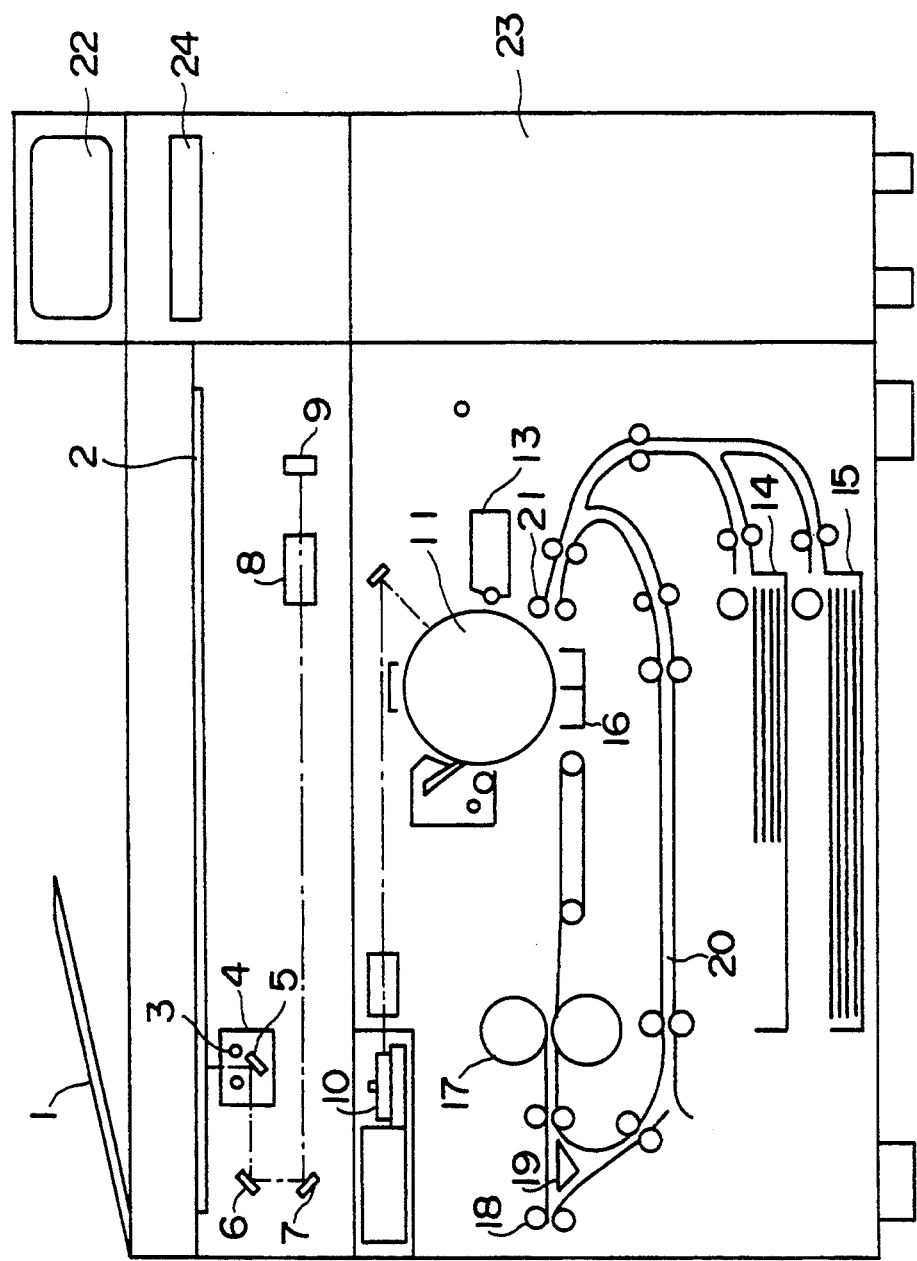
FIG. 1 is a cross-sectional view of an image processing apparatus with multiple functions constituting an embodiment of the present invention.

FIG. 1 is a cross-sectional view of an image processing apparatus with multiple functions constituting an embodiment of the present invention.

An original feeder 1 feeds the original documents, stacked on a feeder tray, one by one onto an original glass plate 2. When the original is fed, original illuminating lamps 3 are turned on, and a scanner unit 4 is moved at a predetermined speed to illuminate the original placed on the glass plate 2. The light reflected by the original is guided by mirrors 5, 6, 7 and a lens 8 and is focused on an image sensor 9. An exposure control unit 10 irradiates a photosensitive member 11 with a laser beam, according to a print signal, processed by the image information read by the image sensor 9. A latent image formed on the photosensitive member 11 by the laser beam is developed by a developing unit 13. A recording sheet is transported from a sheet stacker unit 14 or 15 in synchronization with the formation of the latent image, and the developed image is transferred onto the recording sheet in a transfer unit 16. The transferred image is fixed in a fixing unit 17 onto the recording sheet, which is discharged from a discharge unit 18.

The images read in succession can be recorded on both faces of the recording sheet in the following manner.

The recording sheet subjected to image fixation in the fixing unit 17 is transported to the discharge unit 18, then is inverted in the transporting direction and is guided through a flapper 19 to a sheet re-feeding stacker 20. A next original image is read as explained above, but the recording sheet is fed from the sheet re-feeding stacker 20, whereby two original images are recorded on both faces of the same recording sheet. An external display unit 22 is used, for example, for retrieving a desired image from the image data stored in a detachable memory means, such as a magneto-optical disk. A casing 23, corresponding to a peripheral equipment to be explained later, contains a control circuit for a drive device to be explained later, a facsimile function unit utilizing a communication channel, and a printer interface unit for printing data in the main apparatus, in response to a command from a computer. A driving device 24 is provided for a detachable memory medium such as a magneto-optical disk, for recording the image signal from the image sensor 9, in a format matching the disk. There are also shown registration rollers 21.

Figure 2:
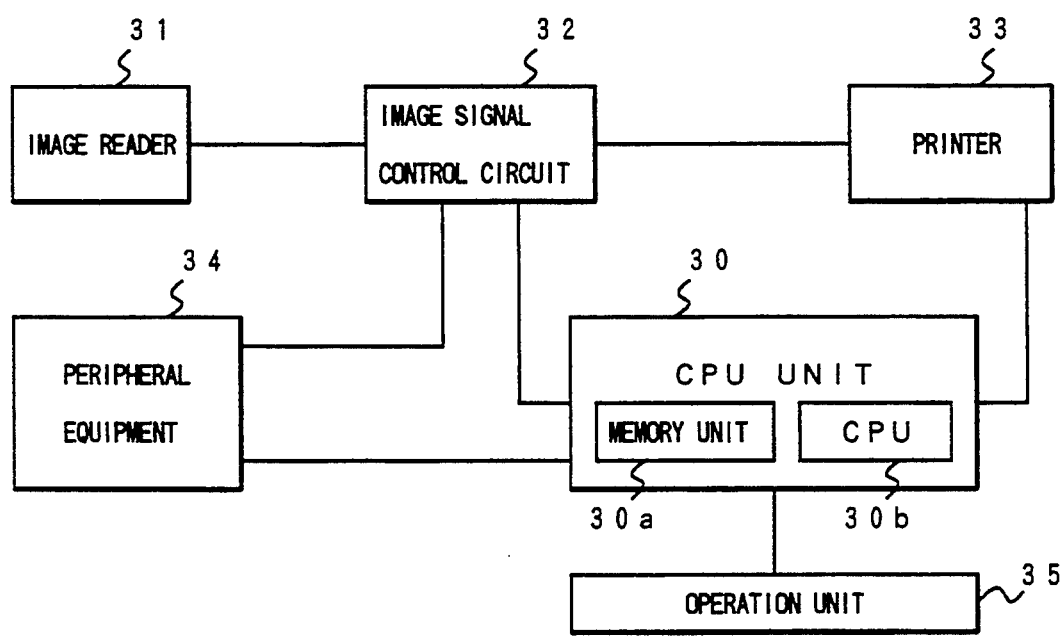
FIG. 2 is a block diagram, showing the control system of the image processing apparatus shown in FIG. 1.

FIG. 2 is a block diagram of the control system of the image processing apparatus with multiple functions shown in FIG. 1.

An image reader 31 is provided with the image sensor 9 and supplies an image signal control circuit 32 with an analog image signal read by an image sensor 9. A CPU unit 30, provided with a ROM and RAM (not shown), controls the image forming operations based on a control program stored in said ROM, also receives the control information relating to a peripheral equipment 34 connected to the image processing apparatus by a communication process and stores the received control information (including image display information for operation) in a RAM 302. Also under control by the CPU unit 30, the image signal control circuit 32 processes the image signal, and sends the processed signal to a printer 33. The signal supplied to the printer 33 is converted into an optical signal in the exposure control unit 10, and is used for irradiating the photosensitive member 11. An operation unit 35 is provided with a display device for displaying the operation sequence of the main apparatus, the function status thereof and the operation sequence of the peripheral equipment 34, and with various operation instructing keys. A memory unit 30a stores the operation unit control information (program, data) relating to the functions of the peripheral equipment, transferred therefrom through communication means. There is also shown a CPU 30b.

In the following there will be explained, with reference to FIGS. 3 to 8, an example of operation for the peripheral equipment 34 shown in FIG. 2.

Figure 3:
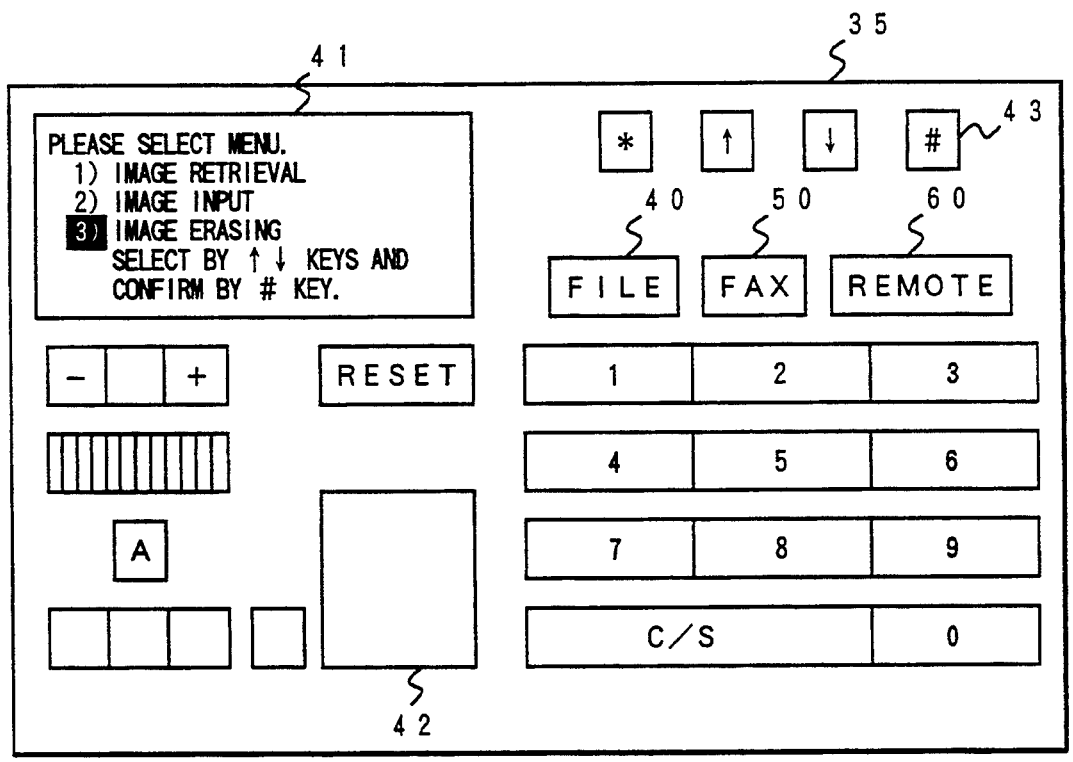
FIG. 3 is a plan view showing an example of the operation unit shown in FIG. 2.
Figure 4:
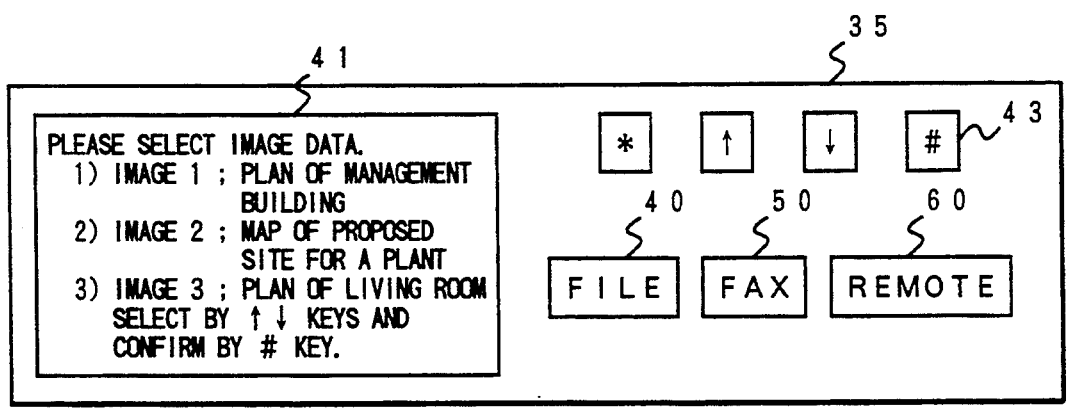
FIGS. 4 to 7 are plan views showing examples of image display provided in the operation unit.

FIG. 3 is a plan view showing an example of the operation unit 35 shown in FIG. 2, of which structure and functions will be explained in the following.

At first there will be explained operation for an image file mode.

When a file key 40, for settling the image file mode, is depressed, a menu image as shown in FIG. 3 is displayed on the display unit 41. The user selects one of the "image retrieval", "image input" and "image erasure". For example, when the "image retrieval" is selected, the display on the display unit 41 is switched a s shown in FIG. 4.

At the image retrieval, the keywords attached in advance to each image data are simultaneously displayed, in order to assist the image selection by the user. When the user selects a desired image from the displayed image data list, the corresponding image data is displayed on the display unit 41 (or 22). After confirming the displayed image, the user depresses a copy start key 42, whereupon the selected image data are printed by the printer 33.

In the following operation is explained for facsimile communication.

Figure 5:
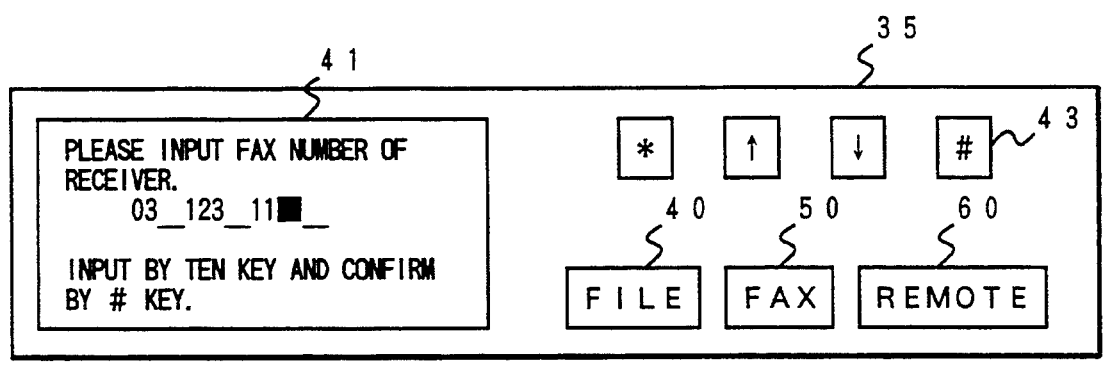
Figure 6:
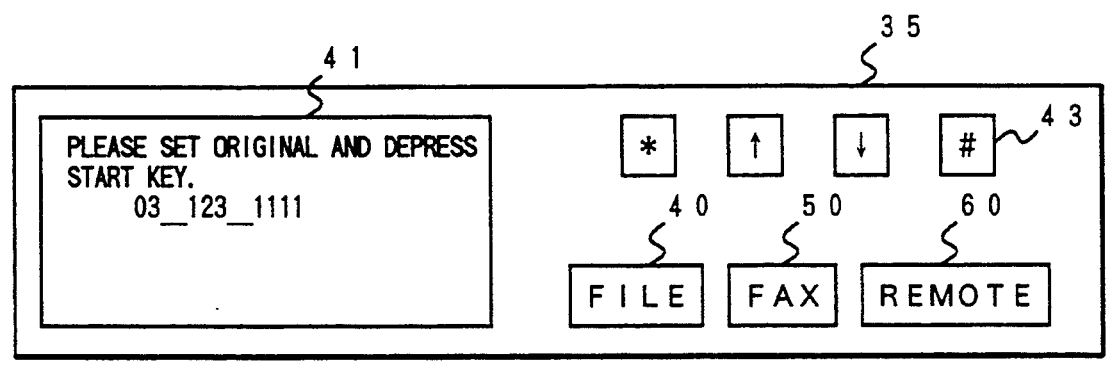

A facsimile key 50 shown in FIG. 3 is depressed for utilizing the facsimile communication function, whereupon the display unit 41 is switched on a display, for entering the facsimile number of the destination, as shown in FIG. 5. According to the displayed instruction, the user enters the facsimile number by the numerical keys of the operation unit 35, and then depressed a confirmation (#) key 43, whereupon the display of the display unit 41 is switched as shown in FIG. 6. Then the original to be transmitted is placed on the glass plate 2 or on the original feeder 1 and the copy start key 42 is depressed, whereby the facsimile control circuit in the casing 23 initiates the communication process.

In the following, the operation is explained for printing the data transmitted from a computer.

Figure 7:
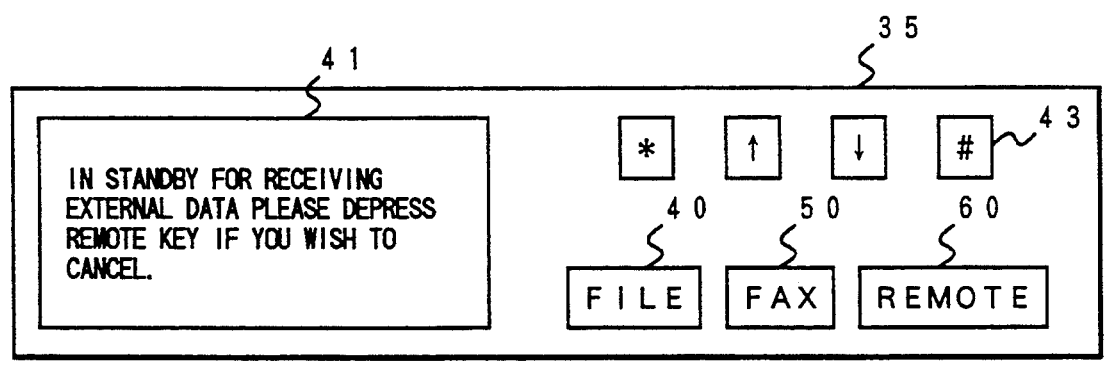

Depression of a remote key 60 initiates a mode for awaiting reception of data entered externally. In this state the display on the operation unit 35 is switched as shown in FIG. 7.

When output data are transmitted from the computer, they are sent to, and processed in an LBP unit 1007 to be explained later.

Figure 8:
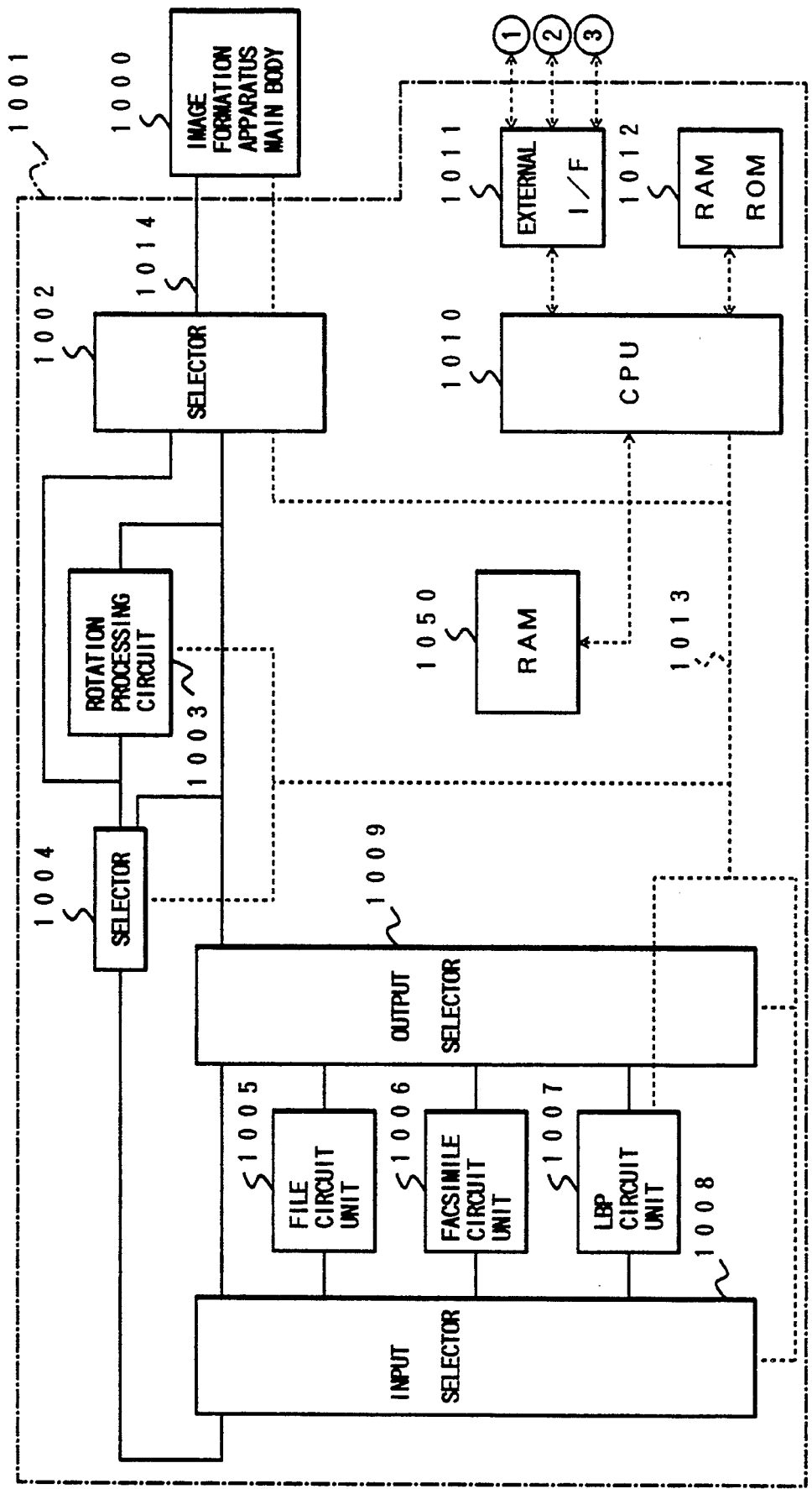
FIG. 8 is a block diagram of a peripheral equipment.

FIG. 8 is a block diagram of the peripheral equipment in the casing 23 shown in FIG. 1.

In FIG. 8, 1000 indicates a main image processing apparatus, and 1001 indicates a peripheral equipment corresponding to the casing 23 shown in FIG. 2. A selector 1002 either sends the image data from the main apparatus 1000 to the peripheral equipment 1001, or sends the image data from the peripheral equipment 1001 to the main apparatus 1000. A rotation process circuit 1003 effects rotation on the image data to be transferred to the image processing circuit or the image data therefrom. A selector 1004 either selects the image data from the rotation process circuit 1003 or those without passing the rotation process circuit 1003, or selects neither. An input selector 1008 sends the image data from the selector 1004 to a file circuit 1005, a facsimile circuit 1006 and/or an LBP circuit 1007. The file circuit 1005 files the image data from the input selector 1008 or releases the filed data to an output selector 1009. The file circuit 1005 is provided with a drive device 24 for the memory means and an external display unit 22, shown in FIG. 1.

The facsimile circuit 1006 effects facsimile transmission of the image data from the input selector 1008, or sends received image data to the output selector 1009. The LBP circuit 1007 develops the image data from the input selector 1008 in a print memory provided therein, or releases the image data developed with a page description language to the output selector 1009. The output selector transfers the image data from the file circuit 1005, facsimile circuit 1006 or LBP circuit 1007 to the selector 1004, rotation process circuit 1003 or selector 1002. A CPU 1010 effects communication with the image processing apparatus 100, file circuit 1005, facsimile circuit 1006 and LBP circuit 1007, and also controls the selectors and further controls the entire peripheral equipment through an external interface circuit 1001. A ROM/RAM unit 1012 stores control programs and control data. There are also provided a communication line 1013, an image data line 1014 and a RAM 1050.

The file circuit 1005 stores an operation unit control program and display image data relating to filing functions. The facsimile circuit 1006 stores an operation unit control program and display image data relating to facsimile functions. Also, the LBP circuit 1007 stores an operation unit control program and display image data relating to printer functions. The circuits 1005, 1006, 1007 are rendered detachable from the peripheral equipment, and the circuits of required functions alone can be connected thereto.

In the following there will be explained an operation for filing an original.

At first the aforementioned file key is depressed, and, after necessary setting operations, a desired original is placed on the original supporting glass or on the original feeder. In response to the depression of the copy start key 42, various data set from the operation unit are transferred from the main apparatus 1000, through the selector 1002 and the communication line 1013, to the CPU 1010. The set data are further transferred, from the CPU 1010 through the communication line 1013, to the file circuit 1005, which in response effects settings and sends a ready signal to the CPU 1010. In response to the ready signal, the CPU 1010 controls the selector 1002 in such a manner that the image data transfer takes place from the main apparatus 1000 to the rotation process circuit 1003, and also controls the selector 1004 and the input selector 1008 in such a manner that the image data transfer takes place from the rotation process circuit 1003 through the selector 1004 and the input selector 1008 to the file circuit 1005. In this manner the transfer route for the image data is determined. Then the CPU 1010 sends a ready signal for image fetching to the main apparatus 1000, which, in response, initiates an operation of lighting the lamps 3 and scanning the original by moving the scanner unit 4. The image data obtained by image reading by the image reader 31 are processed in the CPU unit 30, and transferred through the signal line 1014 to the selector 1002, and further transferred to the file circuit 1005 through the above-mentioned signal transfer route. The rotation process circuit 1003 effects a rotation process if the rotation of the entire image data is required, but the rotation process circuit 1003 does not effect any process if such rotation is not required. The file circuit 1005 records the image data by converting the data to the format of the disk. Upon completion of the write-in of the image data, the file circuit 1005 sends a write-in completion signal to the CPU 1010, which in response causes the selector 1002 to disconnect the image data line 1014 from the main apparatus 1000. Then the CPU 1010 sends the write-in completion signal to the main apparatus 1000, which in response returns to the original state. The operation of facsimile transmission of the original is the same as explained above, except that the image data are supplied to the facsimile circuit 1006 instead of the file circuit 1005, and will not, therefore, be explained further.

In the following there will be explained an operation of printing the filed original.

At first the file key 40 of the operation unit 35 is depressed, and there are set various conditions for the printing operation. Subsequently the copy start key 42 is depressed, whereby the various data set by the operation unit are supplied from the main apparatus 1000 through the selector 1002 and the communication line 1013 to the CPU 1010. The data are further transferred from the CPU 1010 through the communication line 1013 to the file circuit 1005, which in response effects settings according to the transferred data, and sends a ready signal to the CPU 1010. Upon reception of the ready signal, the CPU 1010 controls the output selector 1009 in such a manner that the image data are transferred from the file circuit 1005 to the rotation process circuit 1003, and also controls the selectors 1004 and 1002 in such a manner that the image data are further transferred from the rotation 1 process circuit 1003 through the selector 1002 to the main apparatus 1000. In this manner the transfer route for the image data is determined. Subsequently the CPU 1010 sends an image output ready signal to the main apparatus 1000, which in response initiates a printing operation. The image data are supplied to the image signal control circuit 32 shown in FIG. 2. The signal supplied to the pr inter 33 is printed on a recording sheet by the operations explained before. The rotation process circuit 1003 effects of rotation process if the rotation of the entire image data is required, but does not effect any process on the image data if such rotation is not required. When the printing operation is completed, the main apparatus 1000 sends a print completion signal to the CPU 1010, which, in response, controls the selector 1002 to disconnect the image data line 1014 from the main apparatus 1000. Then the CPU 1010 sends a print completion signal to the file circuit 1005, which in response returns to the original state.

The operation of printing the image data received by facsimile transmission or the data received from a computer is conducted in the same manner as the data output from the file circuit 1005, except that the image data are supplied from the facsimile circuit 1006 or the LBP circuit 1007 instead of the file circuit 1005.

In the following, the operation of facsimile transmission of an original image filed in the memory medium of the file circuit 1005 is explained.

At first the file key 40 and the facsimile key 50 are depressed, and the settings are made for the filing and the facsimile transmission. Then the copy start key 42 is depressed, whereby the data set from the operation unit are transferred from the main apparatus 1000, through the selector 1002 and the communication line 1013, to the CPU 1010. The data are further transferred from the CPU 1010, through the communication line 1013, to the file circuit 1005 and the facsimile circuit 1006, which, in response effect settings corresponding to the data and send a ready signal to the CPU 1010. Upon reception of the ready signal, the CPU 1010 controls the output selector 1009 in such a manner that the image data are transferred from the file circuit 1005 to the rotation process circuit 1003, and also controls the selector 1004 and the input selector 1008 in such a manner that the image data are further transferred from the rotation process circuit 1003 through the selector 1004 to the facsimile circuit 1006. The transfer route for the image data is thus determined. Then the CPU 1010 sends an image output ready signal to the file circuit 1005, which, in response, initiates the image data transmission. The rotation process circuit 1003 effects a rotation process if the rotation of the entire image data is required, but it does not effect any process if such rotation is not required. When the transmission is terminated, the file circuit 1005 sends a transmission completion signal to the CPU 1010, which, in response, controls the output selector 1009 to disconnect the image data line. Then the CPU 1010 sends a transmission completion signal to the facsimile circuit 1006, which, in response, returns to the original state.

The operation of filing the image data received by facsimile transmission or the data transferred from a computer or the operation of facsimile transmission of the data from a computer is also conducted in a similar manner, except for a change in the flow of the image data.

In the following there will be explained, with reference to FIGS. 9 to 11, an operation of transferring the operation unit control program of the peripheral equipment, between the peripheral equipment 34 and the main apparatus through the communication line 1013.

Figure 9:
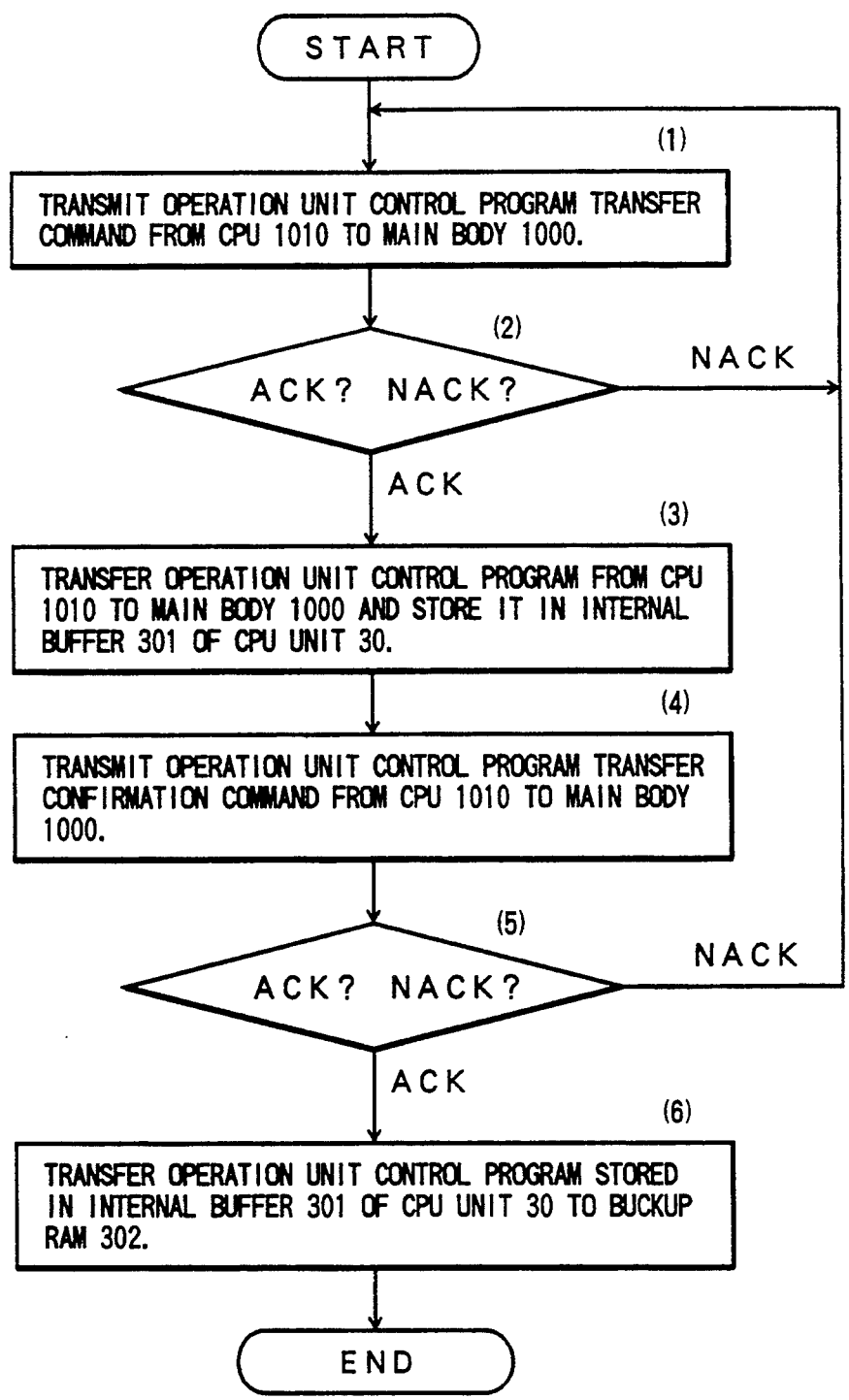
FIG. 9 is a flow chart showing an example of a sequence of transferring an operation unit control program from a peripheral equipment to the main apparatus.
Figure 10:
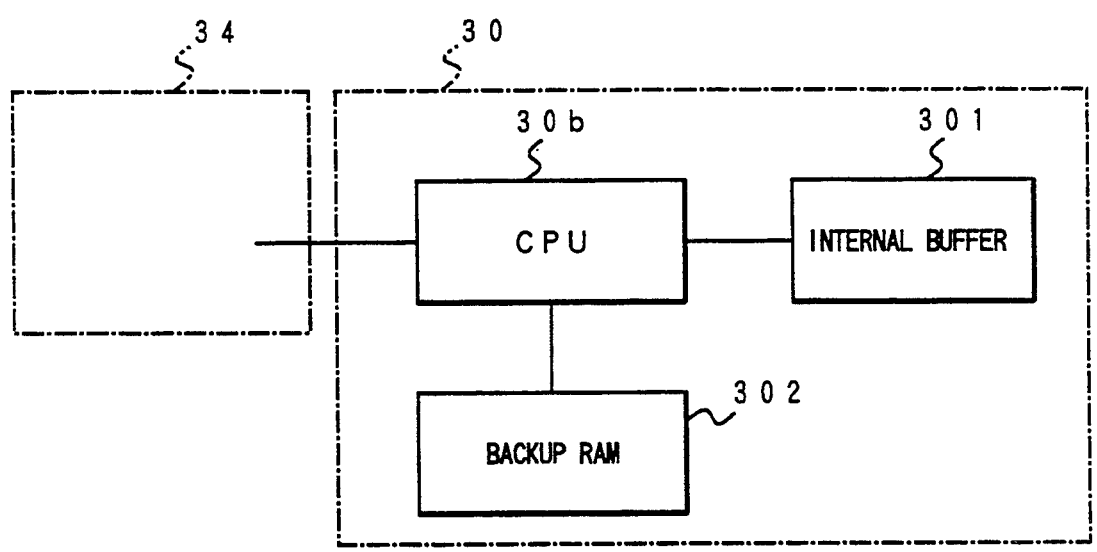
FIG. 10 is a block diagram showing the structure of the CPU unit shown in FIG. 2.

FIG. 9 is a flow chart showing an example of a sequence of transferring the operation unit control program of the peripheral equipment, between the peripheral equipment and the main apparatus shown in FIG. 2, wherein ( 1 ) to ( 6 ) indicate the steps of the sequence.

When the power supply is turned on while the peripheral equipment 34 is connected to the main apparatus 1000, the CPU 1010 sends a command for transferring the operation unit control program to the main apparatus 1000 (step (1)), which, in response, sends a command status signal (ACK) to the CPU 1010 (step (2)). Upon reception of the command status signal, the CPU 1010 transfers the operation unit control programs, stored in the file circuit 1005, facsimile circuit 1006 and LBP circuit 1007 of the peripheral equipment 34 to the main apparatus 1000 through the communication line 1013. The main apparatus 1000 temporarily stores the operation unit control programs in an internal buffer 301 of the CPU unit 30 shown in FIG. 10 (step (3)). After the transfer of all the data, the CPU 1010 sends a confirmation command for the operation unit control program transfer to the main apparatus 1000 (step (4)), which, in response, sends a command status signal (ACK) to the CPU 1010 (step (5)). Upon reception of the transfer confirmation command, the CPU unit 30 of the main apparatus 1000 transfers the data (operation unit control programs) temporarily stored in the internal buffer 301 to the back-up RAM 302 of the CPU unit 30 shown in FIG. 10 (step (6)). In this manner, the transfer of the operation unit control programs of the peripheral equipment, between said peripheral equipment 34 and the main apparatus through the communication line 1013 is completed. In case the command cannot be recognized by a communication error, a command non-acknowledgement (NACK) status signal is sent from the main apparatus 1000 to the CPU 1010, which, in response, resends the command.

In the following there will be explained the transfer of the operation unit image data of the peripheral equipment, between the peripheral equipment 34 and the main apparatus through the communication line 1013.

Figure 11:
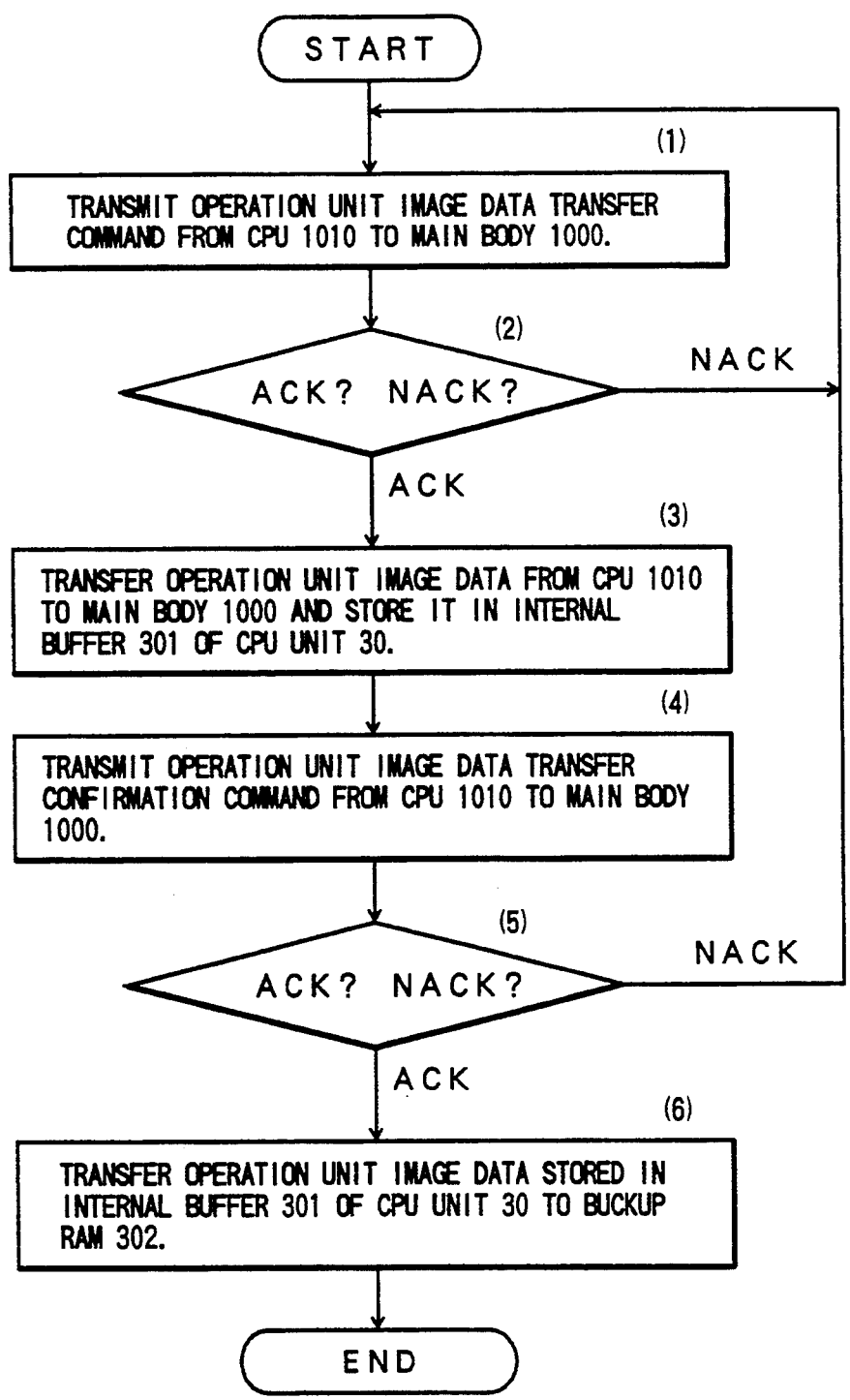
FIG. 11 is a flow chart showing an example of a sequence of transferring an operation unit image data from a peripheral equipment to the main apparatus.

FIG. 11 is a flow chart showing an example of a sequence of transferring the operation unit image data of the peripheral equipment, between the peripheral equipment and the main apparatus shown in FIG. 2, wherein (1) to (6) indicate steps of the sequence.

At first, the CPU 1010 sends a command for transferring the operation unit image data to the main apparatus 1000 (step (1)), which, in response, sends a command status (ACK) signal to the CPU 1010 (step ( 2 )). Upon reception of the command status (ACK) signal, the CPU 1010 transfers the operation unit image data of the peripheral equipment 34 through the communication line 1013. The main apparatus 1000 temporarily stores thus received operation unit image data of the peripheral equipment 34 in the internal buffer 301 of the CPU unit 30 shown in FIG. 10 (step (3)). After the transfer of all the data, the CPU 1010 sends a confirmation command for the transfer of the operation unit image data to the main apparatus 1000 (step (4)), which, in response, sends a command recognition status (ACK) signal to the CPU 1010 (step (5)). In response, the CPU unit 30 of the main apparatus 1000 transfers the operation unit image data, temporarily stored in the internal buffer 301, to the back-up RAM 302 of the CPU unit 30 shown in FIG. 10 (step (6)). In this manner, the transfer of the operation unit image data of the peripheral equipment, between the peripheral equipment 34 and the main apparatus through the communication line 1013 is completed. In case the command cannot be recognized by a communication error, the main apparatus 1000 sends a command non-acknowledgement status (NACK) signal to the CPU 1010, which, in response, resends the command. The data format, transfer condition and examples of command of said command non-acknowledgement status (NACK) are shown in FIGS. 12A, 12B and 12C.

Figures 12A, 12B, 12C:
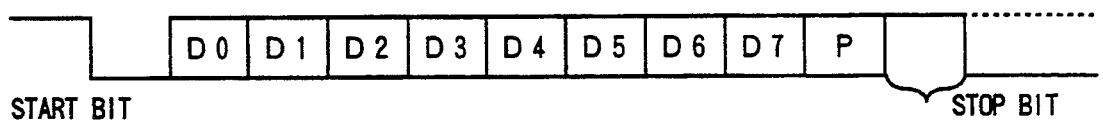
FIGS. 12A, 12B and 12C are views showing a method of transferring the operation unit image data from the peripheral equipment to the main apparatus.

FIGS. 12A, 12B and 12C explain the method of transfer of the operation unit image data of the peripheral equipment, between the peripheral equipment 34 and the main apparatus through the communication line 1013 shown in FIG. 8.

FIG. 12A shows the data format of the transferred data, while FIG. 12B shows the method of transfer, and FIG. 12C shows examples of commands, for example the transfer command for the operation unit control program (03H), the transfer confirmation command for the operation unit control program (13H), the transfer command for the operation unit image data (04H), and the transfer confirmation command for the operation unit image data (14H).

In the following there will be explained the display control in the main apparatus 1000, based on the operation unit control programs and the operation unit image display data, thus transferred.

When the facsimile communication function is utilized, the facsimile key 50 of the operation unit 35 shown in FIG. 3 is depressed. Recognizing the depression of the facsimile key 50, the CPU unit 30 of the main apparatus reads the operation unit control program and the operation unit display image data for the facsimile function of the peripheral equipment 34, stored in the back-up RAM 302, and switches the operation unit control sequence to a sequence based on the program.

Thus image data shown in FIG. 5 (providing an image display for entering the facsimile number of the destination) are read from the back-up RAM 302 and displayed on the display unit 41.

According to the displayed instruction, the user enters the facsimile number by means of the numeral keys. This input control is also executed according to the operation unit control program transferred from the peripheral equipment 34 to the main apparatus 1000.

After the entry of the facsimile number, the user depresses a confirmation key 43 to confirm the entered data, whereupon the display unit 41 is switched to a display shown in FIG. 6. This switching control is also executed according to the operation unit control program transferred from the peripheral equipment 34 to the main apparatus 1000. Then, in response to the depression of the copy start key 42, the facsimile control circuit in the casing 23 initiates a communication control operation. At the same time the display unit 41 of the operation unit 35 is switched to a display shown in FIG. 3. After the completion of communication, the operation unit control sequence is switched to the ordinary control sequence of the main apparatus, and the display unit 41 returns to the display shown in FIG. 14.

In the above-explained embodiment, the operation unit control program and the operation unit display image data of each function of the peripheral equipment are transferred from the peripheral equipment to the main apparatus through communication means, and the main apparatus controls the sequence of each function such as a filing function or facsimile function, based on such transferred program and image data. It is also possible, however, to transfer the image data only to the main apparatus in advance, to execute the operation unit control program in the peripheral equipment according to the selection of the filing function, facsimile function etc. and to send the commands for display control to the main apparatus. Consequently the contents of control are the same as those in the above-explained embodiment. Also the method of transfer of the image data from the peripheral equipment to the main apparatus is the same as in the embodiment.

In the following there will be explained, with reference to FIG. 15, the case of controlling the display of image data transferred in advance to the main apparatus by the operation unit control program executed in the peripheral equipment, thereby giving instructions for the operations thereof.

Figure 15:
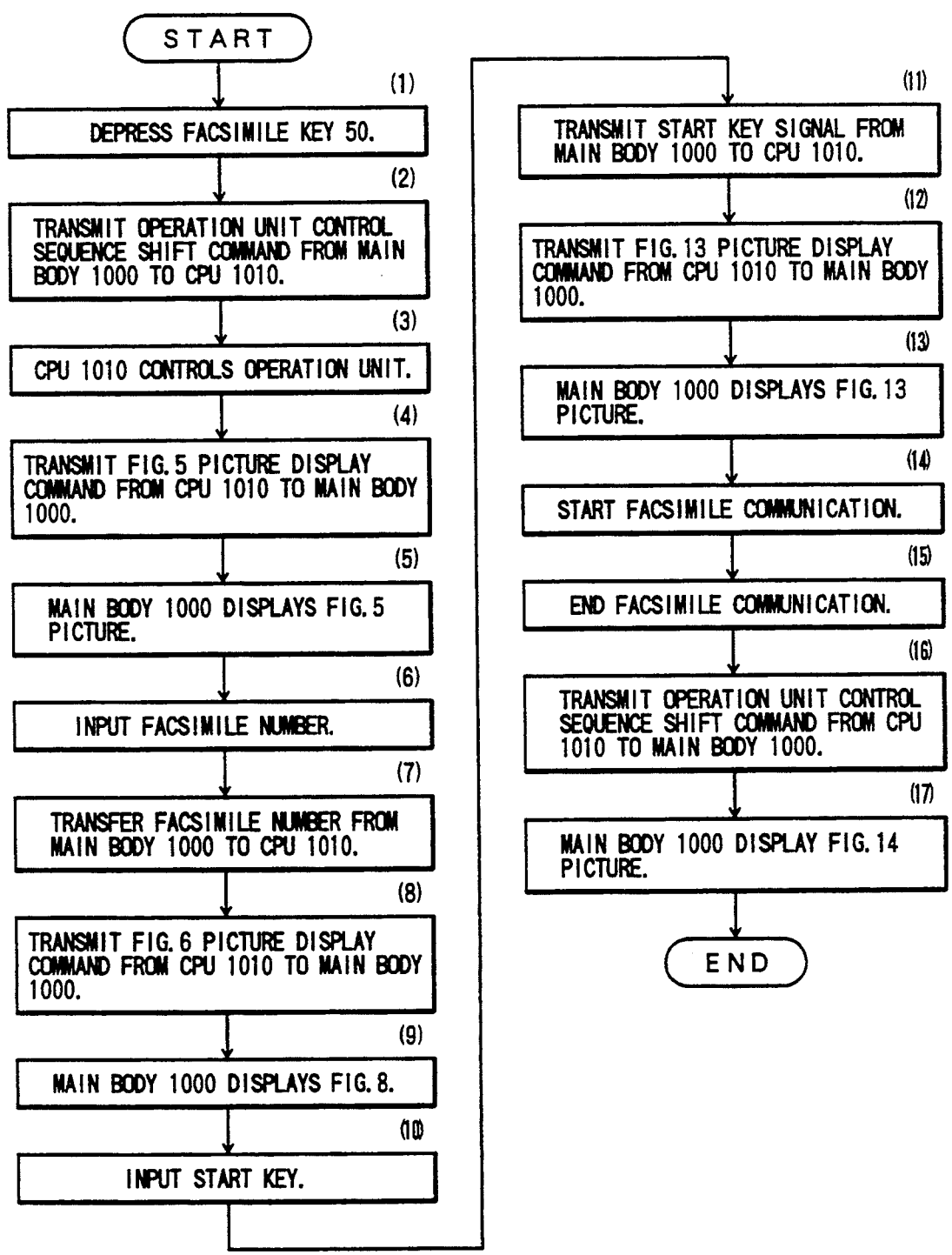
FIG. 15 is a flow chart showing an example of an operation unit control sequence based on the operation sequence information transferred from a peripheral equipment.

FIG. 15 is a flow chart showing an example of a sequence of controlling the peripheral equipment, based on the operation sequence information transferred from the peripheral equipment 34 shown in FIG. 2, wherein (1) to (17) indicate steps of the sequence. It is assumed that the facsimile function is selected among the functions of the peripheral equipment 34.

At first, the facsimile key 50 of the operation unit 35, shown in FIG. 3, is depressed for utilizing the facsimile function (step (1)). Recognizing the depression, the CPU unit 30 of the main apparatus 1000 releases a command for transferring the operation unit control sequence to the peripheral equipment 34 (step (2)). Thus the control of the operation unit 35 is switched to a sequence based on the operation unit control program incorporated in the facsimile circuit 1006 of the peripheral equipment 34, whereby the CPU 1010 can directly control the operation unit 35 (step (3)). Then the CPU 1010 supplies the main apparatus 1000 with a command for reading the image data shown in FIG. 5, transferred in advance to the back-up RAM 302, according to the operation unit control program and displaying the image data on the display unit 41 (step (4)), whereby the image data are displayed as shown in FIG. 5 according to the operation unit control program of the peripheral equipment 34 (step (5)). Then, according to the image display instructing the entry of the facsimile number of the destination as shown in FIG. 5, the user enters the facsimile number of the destination by means of the numeral keys (step (6)). This input control is executed by an operation unit image display program of the main apparatus. When the conformation key 43 is depressed after the entry of the facsimile number, the facsimile number is transferred to the peripheral equipment 34 (step (7)), then a command for displaying image data shown in FIG. 6 is transferred to the main apparatus according to the operation unit control program of the peripheral equipment 34 (step (8)), and the operation unit image display program of the main apparatus displays the image data on the display unit 41 as shown in FIG. 6 (step (9)).

Figure 13:
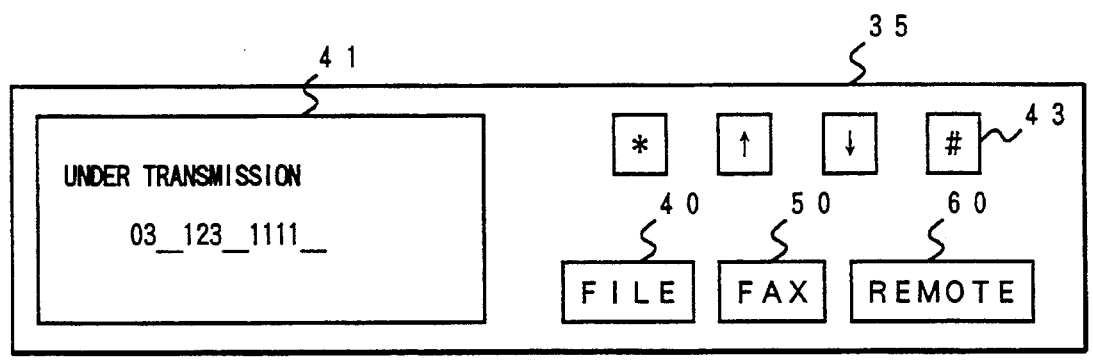
FIGS. 13 and 14 are views showing examples of an image display provided in the operation unit.
Figure 14:
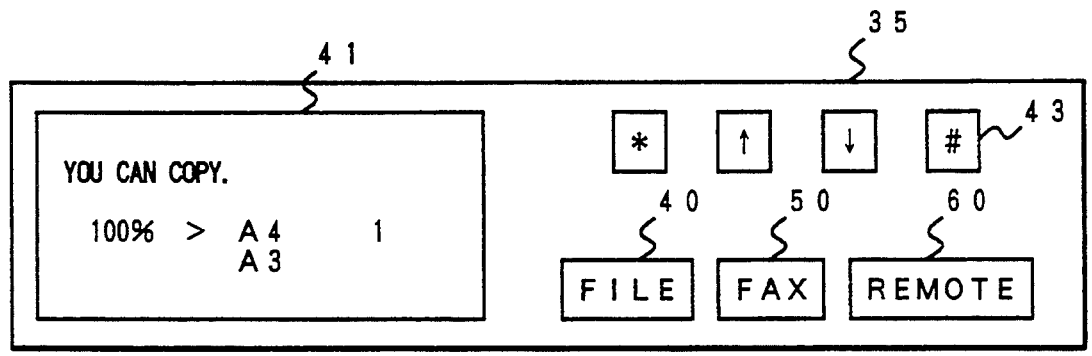

Then an original to be transmitted is placed on the glass plate 2 of the main apparatus, and the copy start key 42 is depressed (step (10)), whereupon a start key depression signal is transferred to the peripheral equipment (step (11)). Then a command for displaying the image data as shown in FIG. 13, is transferred to the main apparatus, according to the operation unit control program of the peripheral equipment ( step ( 12 ) ) . The CPU unit 30 of the main apparatus displays the image data as shown in FIG. 13, by means of the operation unit image display program (step (13)). Subsequently the facsimile circuit 1006 initiates the communication control ( step ( 14 ) ) . After the completion of the facsimile communication ( step ( 15 ) ) , the operation unit control program of the peripheral equipment 34 releases a command for switching the control of the operation unit 35 to the main apparatus (step (16)), whereby the display unit 41 is switched to an ordinary display for instructing the operations of the main apparatus, as shown in FIG. 14 (step (17)). In this state the key inputs and image display of the operation unit 35 are controlled in an ordinary manner by the operation unit control sequence of the main apparatus.

In case the filing function or the printer function is selected, the control is shifted to the peripheral equipment in a similar manner, based on the operation unit control program stored in the filing circuit 1005 or in the LBP circuit 1007.

The present invention is not limited to the foregoing embodiments but is subject to various modifications within the scope and spirit of the appended claims.

What is claimed is:

1. A method for controlling the operation unit in an image processing apparatus with multiple functions, comprising the steps of:

a) transferring a control program and display data for key input and display, relating to an image processing function of a peripheral equipment connected to said image processing apparatus with multiple functions, from said peripheral equipment to said image processing apparatus;

b) storing the control program and the display data, transferred to said image processing apparatus with multiple functions, in a memory; and c) in response to a selection of the image processing function of said peripheral equipment, switching the operation unit from a control based on a control program and display data for key input and display incorporated in advance in said image processing apparatus with multiple functions to a control based on the control program and the display data stored in said memory.

2. A method according to claim 1, further comprising the step of:

d) after an execution of the selected image processing function of said peripheral equipment, switching the operation unit from the control based on the control program and the display data stored in said memory to the control based on the control program and the display data for key input and display incorporated in advance in said image processing apparatus with multiple functions.

3. A method according to claim 1, wherein the image processing function of said peripheral equipment is a function of filing an image in a memory medium and retrieving the image filed in said memory medium.

4. A method according to claim 1, wherein the image processing function of said peripheral equipment is a function of facsimile transmission and reception of an image.

5. A method according to claim 1, wherein the image processing function of said peripheral equipment is a function of converting information transferred from a computer into a printable form.

6. An image processing apparatus with multiple functions comprising:

display means for providing display relating to an input operation for image processing;

control means for controlling said display means, based on a first control program and display data for key input and display, relating to an image processing function of said image processing apparatus with multiple functions, said first control program and display data being stored in advance in said image processing apparatus with multiple functions;

reception means for receiving a second control program and display data for key input and display, relating to an image processing function of a peripheral equipment connected to said image processing apparatus with multiple functions, from said peripheral equipment;

memory means for storing the control program and the display data received by said reception means; and selection means for selecting the image processing function of said peripheral equipment;

wherein, in response to the selection of the image processing function of said peripheral equipment by said selection means, said control means is adapted to switch from a control based on said first control program and display data to a control based on said second control program and display data, stored in said memory means.

7. An apparatus according to claim 6, wherein, in response to a completion of execution of the image processing function of said peripheral equipment. selected by said selection means, said control means is adapted to switch from the control based on said second control program and display data to the control based on said first control program and display data.

8. An apparatus according to claim 6, wherein the image processing function of said peripheral equipment is a function of filing an image in a memory medium and retrieving the image field in said memory medium.

9. An apparatus according to claim 6, wherein the image processing function of said peripheral equipment is a function of facsimile transmission and reception of an image.

10. An apparatus according to claim 6, wherein the image processing function of said peripheral equipment is a function of converting information transferred from a computer into a printable form.

11. A method for controlling the operation unit in an image processing apparatus with multiple functions, comprising the steps of:

a) transferring display data for key input and display relating to an image processing function of a peripheral equipment connected to said image processing apparatus with multiple functions, from said peripheral equipment to said composite image processing apparatus;

b) storing the display data, transferred to said image processing apparatus with multiple functions, in a memory;

c) in response to a selection of the image processing function of said peripheral equipment, switching the operation unit from a control based on a first control program and display data for key input and display, incorporated in advance in said image processing apparatus with multiple functions to a control based on a second control program for key input and display incorporated in said peripheral equipment and on the display data stored in said memory; and d) transferring commands for displaying the display data stored in said memory, from said peripheral equipment to said image processing apparatus with 12. An image processing apparatus with multiple functions, comprising:

display means for providing display relating to an input operation for image processing;

control means for controlling said display means, based on a first control program and display data for key input and display, relating to an image processing function of said image processing apparatus with multiple functions, said first control program and display data being stored in advance in said image processing apparatus with multiple functions;

reception means for receiving display data for key input and display, relating to an image processing function of a peripheral equipment connected to said image processing apparatus with multiple functions, from said peripheral equipment;

memory means for storing the display data received by said reception means; and selection means for selecting the image processing function of said peripheral equipment;

wherein, in response to the selection of the image processing function of said peripheral equipment by said selection means, said control means is adapted to switch from a control based on said first control program and display data to a control based on the second control program for key input and display of said peripheral equipment and the display data stored in said memory.

13. An apparatus according to claim 12, wherein, in response to the selection of the image processing function of said peripheral equipment by said selection means, said control means is adapted to display the display data, stored in said memory, by said display means, according to commands transferred to said image processing apparatus with multiple functions from said peripheral equipment according to an execution of said second control program thereby.

* * * * *

UNITED STATES PATENT AND TRADEMARK OFFICE
CERTIFICATE OF CORRECTION

PATENT NO. : 5,371,574

DATED : December 6, 1994

INVENTOR(S) : Hiroshi Ohmura et al

Page 1 of 2

It is certified that error appears in the above-indentified patent and that said Letters Patent is hereby corrected as shown below:

AT [57] ABSTRACT

Line 1, "worth" should read --with--.
Line 4, "an" should read --or an --.

IN THE DRAWINGS

SHEET 8 OF 11

"BUCKUP" should read --BACKUP--.

COLUMN 1

Line 25, "a" should read --an--.
Line 27, "example" should read --example,--.

COLUMN 4

Line 7, "operation" should read --an operation--.
Line 15, "a s" should read --as--.
Line 25, "following" should read --following,--.
Line 33, "depressed" should read --depresses--.

COLUMN 6

Line 37, "pr inter 33" should read --printer 33--.

UNITED STATES PATENT AND TRADEMARK OFFICE
CERTIFICATE OF CORRECTION

PATENT NO. : 5,371,574
DATED : December 6, 1994
INVENTOR(S) : Hiroshi Ohmura et al It is certified that error appears in the above-indentified patent and that said Letters Patent is hereby corrected as shown below:

COLUMN 7

Line 2, ".signal," should read --signal,--.

COLUMN 11

Line 58, "equipment." should read --equipment,--.

COLUMN 12

Line 30, "with" should read --with multiple functions, according to an execution of said second control program.--.

Signed and Sealed this

Fourth Day of April, 1995

Attest:

BRUCE LEHMAN

Attesting Officer     Commissioner of Patents and Trademarks